United States Patent [19]
Woo et al.

[11] Patent Number: 5,869,417
[45] Date of Patent: Feb. 9, 1999

[54] PROCESS FOR PREPARING METALLOCENE CATALYST FOR POLYOLEFIN POLYMERIZATION

[75] Inventors: Seong-Ihl Woo; Young-Soo Ko, both of Seoul, Rep. of Korea

[73] Assignee: Korea Advanced Institute of Science and Technology, Taejon, Rep. of Korea

[21] Appl. No.: 697,978

[22] Filed: Sep. 3, 1996

[30] Foreign Application Priority Data

Sep. 1, 1995 [KR] Rep. of Korea .................. 1995-28603

[51] Int. Cl.⁶ .............................. B01J 31/00; B01J 37/00; C08F 4/02; C08F 4/60
[52] U.S. Cl. .............................. 502/107; 502/62; 502/64; 502/79; 502/103; 502/104; 502/117; 502/120; 502/132
[58] Field of Search ................ 502/63, 73, 104, 502/107, 118, 120, 129, 132, 62, 64, 79

[56] References Cited

U.S. PATENT DOCUMENTS

| | | | |
|---|---|---|---|
| 4,118,340 | 10/1978 | Rekers ..................... | 502/117 |
| 4,405,495 | 9/1983 | Lee et al. ................. | 526/125 |
| 4,808,561 | 2/1989 | Welborn, Jr. ............. | 502/104 |
| 4,904,631 | 2/1990 | Chang ..................... | 502/120 |
| 4,912,076 | 3/1990 | Chang ..................... | 502/107 |
| 5,068,485 | 11/1991 | Iton et al. ................. | 502/38 |
| 5,102,643 | 4/1992 | Kresge et al. ............ | 502/64 |
| 5,105,051 | 4/1992 | Perline et al. ........... | 585/528 |
| 5,306,683 | 4/1994 | Maroni et al. ............ | 502/60 |
| 5,308,811 | 5/1994 | Suga et al. ............... | 502/103 |

FOREIGN PATENT DOCUMENTS

| | | |
|---|---|---|
| 0 421 659 A2 | 4/1991 | European Pat. Off. . |
| 0 435 514 A2 | 7/1991 | European Pat. Off. . |
| 0 436 326 A1 | 7/1991 | European Pat. Off. . |
| 2 000 508 | 7/1971 | Germany .................. 502/132 |

OTHER PUBLICATIONS

S.I. Woo et al. *Polymerization of Ethylene over Metallocenes Confined Inside the Supercage of a NaY Zeolite*, Macromol.Rapid Commun., 16:489–494 (1995).

M.E. Davis et al., *A Molecular Sieve with Eighteen–Membered Rings*, Nature, 331:698–699 (1988).

S. Collins, et al. *Polymerization of Propylene Using Supported, Chiral, ansa–Metallocene Catalysts . . .* , Macromolecules, 25;1780–1785 (1992).

K. Soga :& M. Kaminaka, *Polymerization of Propene with Zirconocene–Containing . . .* , Makromol.Chem., 194:1745–1755 (1993).

W. Kaminsky & F. Renner *High Melting Polypropanes by Silica–Supported Zirconcene Catalysts*, Makromol.Chem., Rapid Commun., 14:239–243 (1993).

S.I. Woo et al. *Olefin Polymerization Catalyzed over Zeolite–Supported Metallocene Catalysts*, Proceedings of 2nd Int. Congress on Metallocene Polymers, Metallocenes '96, 271–292 (1996).

*Primary Examiner*—Mark L. Bell
*Assistant Examiner*—J. Pasterczyk
*Attorney, Agent, or Firm*—Darby & Darby

[57] ABSTRACT

The present invention provides a process for preparing a highly active metallocene catalyst by which polyolefin having improved properties can be prepared with a small amount of cocatalyst. A process for preparing a metallocene catalyst of the invention comprises the steps of: modifying the surface of a zeolite or molecular sieve inorganic carrier possessing crystalline pores of 7 to 100 Å size by the addition of an organic solvent and organic aluminum compound under an environment of inert gas and reacting at a constant temperature, and drying; and, impregnating a metallocene compound into the inorganic carrier by the addition of an organic solvent and said metallocene compound, whose diameter is smaller than the diameters of said pores of the inorganic carrier, to the inorganic carrier and reacting at a constant temperature, and drying. In accordance with the present invention, a highly active metallocene catalyst can be prepared in an economical and efficient manner.

7 Claims, No Drawings

PROCESS FOR PREPARING METALLOCENE CATALYST FOR POLYOLEFIN POLYMERIZATION

FIELD OF THE INVENTION

The present invention relates to a process for preparing a supported metallocene catalyst for the polymerization of olefins, more specifically, to a process for preparing a highly active metallocene catalyst by which a polyolefin having improved properties can be prepared with a small amount of cocatalyst.

BACKGROUND OF THE INVENTION

A variety of impregnated catalysts have been practically applied in the polymerization of olefins such as ethylene and propylene to prepare polyolefin. Among them, a metallocene catalyst, which is prepared by impregnating metallocene compound on inorganic carriers such as alumina and silica for the preparation of polyolefin, has prevailed in the art.

In general, a metallocene catalyst is prepared by adding an organic solvent and an organic aluminum compound to inorganic carriers such as alumina and silica under an environment of inert gas, to modify the surface of the inorganic carrier, and impregnating the surface-modified inorganic carrier with the metallocene compound, and drying.

On the other hand, polyolefin is prepared by adding the metallocene catalyst thus prepared to organic solvent and one or more olefin monomers such as ethylene, carrying out slurry or liquid type polymerization under a constant temperature and pressure in the presence of excessive amounts of organic aluminum compound such as methylaluminoxane as a cocatalyst, adding hydrogen to the reaction mixture in order to modulate molecular weight and terminating the reaction.

Since the supported metallocene catalyst plays a critical role on the properties of polyolefin such as tacticity, shape of polymer particle, molecular weight, and distribution of molecular weight, etc., studies on the preparation of metallocene catalysts having more improved properties have been actively carried out.

For example, U.S. Pat. No. 4,808,561, U.S. Pat. No. 4,912,875 and U.S. Pat. No. 4,904,631 teach a process for preparing a metallocene catalyst by modifying the surface of an inorganic silica carrier with methylaluminoxane or modifying the surface of water-deposited silica with alkyl aluminum and impregnating with metallocene compounds such as bis(cyclopentadienyl) zirconium dichloride, etc.

Also, U.S. Pat. No. 5,308,811 describes a process for preparing a metallocene catalyst by treating the surface of alumina with methylaluminoxane and impregnating with metallocene compound.

However, these prior art metallocene catalysts are proven to be less satisfactory in the sense that: polyolefin can not be produced with a high yield, since the conventional metallocene catalyst has low activity; shaping of the polymer is not so good, since shape of polyolefin thus prepared is not spherical; properties of polyolefin are not good, since a lot of remnants such as aluminum and metallocene metal remain within the prepared polymer which is caused by the excessive use of cocatalyst; and, the cost for polyolefin preparation is extremely high.

On the other hand, EP 436,326 A1 and EP 435,514 A2 disclose a process for preparing a metallocene catalyst in which prepolymerizing reaction was carried out by impregnating the metallocene compound and an electron donor compound on an inorganic carrier of magnesium chloride. The metallocene catalyst thus prepared permits preparation of polyolefin possessing reduced amount of remnants such as metallocene metal, etc. However, the prior art, like the above-mentioned prior art, has revealed some shortcomings: polyolefin can not be produced with a high yield, since the metallocene catalyst has low activity; and, shaping of the polymer is not so good, since the shape of polyolefin thus prepared is not spherical.

Under the circumstances, the present inventors have found that the problems of conventional supported metallocene catalysts result from the use of amorphorous or paracrystalline inorganic carriers such as silica having irregular pores whose spatial arrangement is distributed widely.

SUMMARY OF THE INVENTION

In accordance with the present invention, the inventors have prepared a metallocene catalyst employing an inorganic carrier possessing crystalline pores, instead of the inorganic carriers of the prior art, finally to prepare polyolefin having improved properties with a high degree of efficiencies, with a reduced amount of cocatalyst.

A primary object of the present invention is, therefore, to provide a process for preparing a highly active supported metallocene catalyst employing an inorganic carrier possessing crystalline pores, by which polyolefin having improved properties can be prepared with a small amount of cocatalyst.

DETAILED DESCRIPTION OF THE INVENTION

A process for preparing a metallocene catalyst to accomplish the object of the invention comprises the steps of:

(1) modifying the surface of inorganic carrier possessing crystalline pores of 7 to 100 Å size by the addition of organic solvent and organic aluminum compound under an environment of inert gas and reacting at a constant temperature, and drying; and, (2) impregnating the metallocene compound on the inorganic carrier by the addition of organic solvent and metallocene compound whose kinetic diameter is smaller than diameters of pores of the inorganic carrier to the inorganic carrier and reacting at a constant temperature, and drying.

In this connection, zeolites possessing micropores of 7 to 15 Å or mesoporous molecular sieve possessing pores of 15 to 100 Å may be preferably employed as the inorganic carrier, where the zeolite can be a Faujasite zeolite such as LINDE TYPE X, LINDE TYPE Y, SAPO-37, CSZ-3, and LZ-210; VPI-5; AlPO-8m; cloverite; or cacoxenite, etc., and the mesoporous molecular sieve can be M41S molecular sieve such as MCM-41, MCM-48, MCM-22, MCM-49, and MCM-56; SAPO molecular sieve; or MeAPO molecular sieve.

Among the said zeolites, Faujasite zeolite whose cell size of cubic unit is very big, comprises 192 $(Si,Al)O_4$ tetrahedra, and the supercage formed by the tetrahedra is connected with 4 other supercages, each of which has a diameter ranging 11 to 12 Å and is communicated by pores of about 7 Å. Also, among the said zeolites, VPI-5 consists of unidimensional 18-member ring channels, which possesses circular pores of 12 to 13 Å diameter.

Among the said mesoporous molecular sieve, M41S, whose pores have a diameter of 15 to 100 Å, has a surface area of more than 700 Å$^2$, and the adsorption capacity of hydrocarbon is more than 0.7 cc/g, is prepared by employing alkyltrimethyl ammonium surfactant which possesses 6 or more alkyl side chains.

On the other hand, the metallocene compound may be selected depending on the type of inorganic carrier, since the metallocene compound whose kinetic diameter of the molecule is smaller than the diameter of the pore of inorganic carrier guarantees a successful impregnation of the inorganic carrier.

Accordingly, provided that Faujasite zeolite is used as an inorganic carrier, bis(cyclopentadienyl)zirconium dichloride, bis(cyclopentadienyl)zirconium dimethyl, bis(cyclopentadienyl)titanium dichloride, bis(cyclopentadienyl)titanium dimethyl, bis(cyclopentadienyl)hafnium dichloride, bis(cyclopentadienyl)hafnium dimethyl, cyclopentadienyltitanium trichloride or cyclopentadienyltitanium trimethyl can be used as a metallocene compound.

Also, provided that VPI-5 zeolite or mesoporous molecular sieve is used as an inorganic carrier, bis(cyclopentadienyl)zirconium dichloride, bis(cyclopentadienyl)zirconium dimethyl, bis(cyclopentadienyl)titanium dichloride, bis(cyclopentadienyl)titanium dimethyl, bis(cyclopentadienyl)hafnium dichloride, bis(cyclopentadienyl)hafnium dimethyl, cyclopentadienyltitanium trichloride, cyclopentadienyltitanium trimethyl, ethylene bis(indenyl)zirconium dichloride, ethylenebis (indenyl) zirconium dimethyl, dimethylsilylbis(indenyl)zirconium dichloride, dimethylsilyl bis(indenyl)zirconium dimethyl, dimethylsilylbis (indenyl)titanium dichloride, dimethylsilylbis(indenyl) titanium dimethyl, dimethylsilylbis(indenyl)hafnium dichloride, dimethylsilylbis(indenyl)hafnium dimethyl, ethylene bis (indenyl) titanium dichloride, ethylenebis (indenyl) titanium dimethyl, ethylenebis (indenyl) hafnium dichloride, ethylene bis(indenyl)hafnium dimethyl, bis (pentamethyl cyclopentadienyl)zirconium dichloride, bis (pentamethyl cyclopentadienyl)zirconium dimethyl, bis (pentamethyl cyclopentadienyl)titanium dichloride, bis (pentamethyl cyclopentadienyl)titanium dimethyl, bis (pentamethyl cyclopentadienyl)hafnium dichloride, bis (pentamethyl cyclopentadienyl)hafnium dimethyl, bis (indenyl)zirconium dichloride, bis(indenyl)zirconium dimethyl, bis(dimethylcyclopentadienyl)zirconium dichloride, bis(dimethylcyclopentadienyl)zirconium dimethyl, isopropylidene(cyclopentadienyl)(fluorenyl) zirconium dichloride, isopropylidene(cyclopentadienyl) (fluorenyl) zirconium dimethyl, dimethylsilyl (cyclopentadienyl) (fluorenyl)zirconium dichloride, dimethylsilyl(cyclopentadienyl) (fluorenyl)zirconium dimethyl, (tert-butylamido) dimethyl (tetramethyl-$\eta^5$-cyclopentadienyl) silanetitanium dichloride, (tert-butylamido)dimethyl(tetramethyl-$\eta^5$-cyclopentadienyl) silanetitanium dimethyl, (tert-butylamido) dimethyl (tetramethyl-$\eta^5$-cyclopentadienyl) silanezirconium dichloride or (tert-butylamido)dimethyl (tetramethyl-$\eta^5$-cyclopentadienyl) silanezirconium dimethyl can be used as a metallocene compound.

Also, methyl aluminoxane; ethyl aluminoxane; alkyl aluminum such as trimethyl aluminum, triethyl aluminum, and triisopropyl aluminum; and, haloalkyl aluminum of a general formula AlR$_i$X$_j$(wherein, R and X represent alkyl and halogen, respectively; and, i+j=3) can be used as the organic aluminum compound, though methyl aluminoxane and alkyl aluminum are most preferred.

Also, toluene, hexane, heptane, octane, xylene, or their mixture can be used as the organic solvent.

Moreover, modification of an inorganic carrier is preferably carried out at a temperature of 0° C. to the boiling point of an organic solvent, impregnation of metallocene compound is preferably carried out at a temperature of 20° C. to the boiling point of an organic solvent for 0.5 to 72 hours.

Preferably, the surface-modified inorganic carrier and a metallocene catalyst impregnated with metallocene compound are washed at least 5 times with an organic solvent, and dried at 10 to 70° C. or under a vacuum condition of 0.1 torr or below, where a drying method using inert gas such as nitrogen flowing at room temperature to 70° C. may be employed, instead of the vacuum-drying method.

Moreover, a supported metallocene catalyst of the invention can be prepared by altering the reaction procedure, e.g., reacting the metallocene compound with an aluminum compound and then an inorganic carrier with them, or reacting an inorganic carrier with a metallocene compound and then with an aluminum compound.

Inorganic carrier, metallocene compound, and aluminum compound are preferably added in a way that the weight ratio of inorganic carrier:metal of metallocene compound:aluminum of aluminum compound is controlled at a range of 1 to 0.001:1 to 0.001:1, metal of metallocene compound:aluminum of aluminum compound is 1 to 0.01:1000, inorganic carrier:metal of metallocene compound is 0.1 to 10:1, and metal of metallocene compound:aluminum of aluminum compound is 0.01 to 10:1.

The metallocene catalyst prepared by the process of the invention can be used for homo-, co-, or ter-polymerization of ethylene, propylene, 1-butene, 1-pentene, 1-hexene, 1-octene, 3-methyl-1-pentene, 4-methyl-1-pentene, styrene, or its derivatives in a phase of slurry, bulk, solution, and gas polymerization. Specifically, toluene, xylene, hexane or heptane can be employed in slurry-phase polymerization, where toluene is most preferred.

Polymerization is preferably carried out at −50° to 200° C., preferably under a pressure of 2 to 20 atmospheres, though the pressure for polymerization has no limits, and hydrogen can be also employed in order to control a molecular weight of polymer.

The present invention is further illustrated by the following examples, which should not be taken to limit the scope of the invention.

EXAMPLE 1:

To a 250 ml round-bottomed flask was added 8.2 g of dehydrated sodium Y zeolite, and 100 ml of toluene and 20 mmol of methylaluminoxane based on a concentration of aluminum, and stirred for 24 hours at 50° C. to initiate reaction. Solid thus obtained was washed five times with 150 cc of toluene, and dried for 2 hours at 25° C. under a vacuum condition of 0.1 torr or below to modify surface of inorganic carrier. 1 mmol of bis(cyclopentadienyl)zirconium dichloride and 100 cc of toluene were added to sodium Y zeolite whose surface was treated with methylaluminoxane, and stirred for 48 hours at 50° C. to initiate the reaction. The solid thus obtained was washed 6 times with 150 cc of toluene, and dried for 2 hours at 25° C. under a vacuum condition of 0.1 torr or below to prepare a metallocene catalyst of the invention. The zirconium content in the catalyst thus prepared was 1.06 mmol per 1 g of catalyst, and the molar ratio of aluminum of the catalyst:zirconium was about 30:1.

To a 1 L high pressure polymerization reactor was added 350 cc of toluene and 300 mg of the metallocene catalyst thus obtained, then various amounts of a cocatalyst, i.e., methylaluminoxane were added as shown in Table 1 below, and the reactor was pressurized to reach a level of 8 atmosphere at a temperature of 50° C. or 70° C. employing ethylene gas. At this time, the reaction was carried out for 60 minutes from the moment when a glass ampule containing the catalyst which was set into the reactor was broken by a stirrer. Then, 600 cc of a mixture of HCl and ethanol were added to stop the reaction, and polyethylene thus prepared was washed with ethanol and dried under a vacuum condition to prepare spherical polyethylene. Yield of the polyethylene thus prepared, catalytic activity of metallocene catalyst, number average molecular weight, polydispersity, melting point, and average diameter of the polyethylene are shown in Table 1 below.

TABLE 1

Properties of matter of polyethylene prepared

| Al/Zr molar ratio | Reaction temperature (°C.) | Yield (g) | Catalytic activity* | Mn | Mw/Mn | Tm (°C.) | average diameter ($\mu$m) |
|---|---|---|---|---|---|---|---|
| 186 | 50 | 1.2 | 117 | N/A | N/A | N/A | N/A |
| 242 | 50 | 11.3 | 1055 | 138000 | 3.1 | 138.2 | 831.6 |
| 560 | 50 | 19.8 | 1610 | N/A | N/A | N/A | 566.2 |
| 840 | 50 | 16.5 | 1540 | 138000 | 2.9 | 136.9 | 631.0 |
| 560 | 70 | 36.7 | 3430 | 84000 | 3.2 | 139.8 | N/A |

*Unit: kg/PE (mol Zr · hr)

EXAMPLE 2:

A metallocene catalyst was prepared in the same manner as in Example 1, except for employing bis(cyclopentadienyl) titanium dichloride as a metallocene compound. The content of titanium per 1 g of the catalyst thus prepared was 27.2 $\mu$mol.

Spherical polyethylene which possesses a uniform diameter was prepared in the same manner as in Example 1, except for employing the metallocene catalyst prepared as mentioned above, maintaining the temperature of 50° C. for polymerization, and adding a cocatalyst to reach a molar ratio of Al:Zr was 840:1. Number average molecular weight, polydispersity and melting point of the polyethylene thus prepared, and catalytic activity were 307,000, 5.6, 137.2° C., and 80 kgPE/(molTi.hr), respectively.

EXAMPLE 3:

A metallocene catalyst was prepared in the same manner as in Example 1, except for employing cyclopentadienyltitanium trichloride as a metallocene compound. The content of titanium per 1 g of the catalyst thus prepared was 12.7 $\mu$mol.

To a 250 mL round-bottomed flask were added 0.5 g of the metallocene catalyst, 80 cc of toluene, and 30 cc of styrene monomer, then 0.7 mmol of methylaluminoxane based on a concentration of aluminum were added at a temperature of 50° C., and polymerizing reaction was carried out for 2 hours. And then, 600 cc of the mixture of HCl and ethanol was added to stop the reaction, finally to prepare spherical syndiotactic polystyrene possessing uniform diameter. The amount of polystyrene thus prepared, catalytic activity, melting point, and molecular weight of the polystyrene were 4.5 g, 354 kgPS/(molTi.hr), 260° C., and 43,000, respectively.

EXAMPLE 4:

To a 100 cc round-bottomed flask was added 1.0 g of VPI-5 and dehydrated for 5 hours at 400° C., then 20 cc of toluene and 6 mmol of methylaluminoxane based on a concentration of aluminum were added, and stirred for 24 hours at 50° C., washed 6 times with 50 cc of toluene, and dried for 2 hours at 25° C. under a vacuum condition of 0.1 torr or below to prepare the surface-modified inorganic carrier. 50 mg of ethylene bis(indenyl)zirconium dichloride and 30 cc of toluene were added to the said inorganic carrier, and stirred for 20 hours at 50° C., and washing and drying were carried out as mentioned above, to prepare a metallocene catalyst. The content of zirconium per 1 g of the catalyst thus prepared was 7.5 $\mu$mol.

Polypropylene was prepared in the same manner as in Example 1, except that 0.24 g of the catalyst and 0.8 mmol of methylaluminoxane based on a concentration of aluminum were added, the reactor was pressurized to reach a level of 8.2 atmospheres employing propylene gas and the reaction was carried out for 2 hours at a temperature of 50° C. The amount of polypropylene thus prepared, catalytic activity, and melting point of the polypropylene were 44 g, 1490 kgPP/(molZr.atm.hr) and 135.4° C., respectively. Also, tacticity of the polymer was analyzed that its mmmm tetrad was 84%, and weight average molecular weight, molecular weight distribution and volume average particle diameter were 30,000, 2.93 and 64.9 $\mu$m, respectively.

EXAMPLE 5:

MCM-41 was dehydrated for 24 hours at 500° C. under a flow of nitrogen gas, then 50 cc of toluene and 10 mmol of methylaluminoxane based on a concentration of aluminum were added to 2.0 g of the dehydrated MCM-41, and stirred for 2 hours at a temperature of 50° C., washed at least 5 times with 70 cc of toluene, and dried for 2 hours under a vacuum condition of 0.1 torr or below to prepare the surface-modified inorganic carrier. 71 mg of (tert-butylamido) dimethyl(tetramethyl-$\eta^5$-cyclopentadienyl) silanetitanium dichloride and 500 cc of toluene were added to the said inorgnic carrier, and stirred for 2 hours at 50° C., and washing and drying were carried out as mentioned above, to give a metallocene catalyst. The contents of titanium and aluminum per 1 g of the catalyst thus prepared were 55.1 $\mu$mol and 1.82 mmol, respectively.

Spherical polyethylene having a uniform diameter was prepared in the same manner as in Example 1, except that 0.29 g of the catalyst and 3.2 mmol of methylaluminoxane based on a concentration of aluminum were added and the reaction was carried out for 2 hours at a temperature of 50° C. under a pressure of 11.5 atmosphere. The amount of the polyethylene thus prepared, catalytic activity, and melting point of the polyethylene were 19 g, 595 kgPE/(molTi.hr) and 136.7° C., respectively.

EXAMPLE 6:

To 1.79 g of the dehydrated MCM-41 were added 40 cc of toluene and 7.0 mmol of methylaluminoxane based on a concentration of aluminum, and stirred for 2 hours at a temperature of 50° C., washed 5 times or more with 60 cc of toluene, and dried at 25° C. under a vacuum condition of 0.1 torr or below to prepare the surface-modified inorganic carrier. To the inorganic carrier thus prepared were added 90 mg of ethylene bis(indenyl) zirconium dichloride and 40 cc of toluene, and stirred for 1.5 hours at 50° C., washing and drying were carried out as mentioned above to prepare a metallocene catalyst. The contents of zirconium and aluminum per 1 g of the catalyst thus prepared were 34.0 $\mu$mol and 1.40 mmol, respectively.

Spherical polypropylene having a uniform diameter was prepared in the same manner as in Example 1, except that 0.3 g of the catalyst and 2.4 mmol of trimethylaluminum as a cocatalyst were added and the reaction was carried out for 1 hour at a temperature of 50° C. under a pressure of 5 atmosphere. The amount of the polypropylene thus prepared, catalytic activity, and melting point of the polypropylene were 10.3 g, 202 kgPP/(molZr.atm.hr) and 128.9° C., respectively.

As clearly illustrated and demonstrated above, in accordance with the present invention, a highly active metallocene catalyst can be prepared in an economical and efficient manner, which finally affords the following advantages: polyolefin can be prepared with a high yield; the amount of cocatalyst used in olefin polymerization can be reduced sharply; polyolefin having improved properties can be prepared; remnants in the polyolefin thus produced can be reduced sharply; and, a high quality of polyolefin can be prepared economically.

What is claimed is:

1. A process for preparing a metallocene catalyst which comprises the steps of:
   (i) modifying the surface of an inorganic carrier consisting of a zeolite selected from the group consisting of the Faujasite zeolites SAPO—37, CSZ—3 and LZ—210; VPI—5; ALPO—8 m; cloverite; and cacoxenite possessing micropores of 7 to 15 Å in diameter by the addition of an organic solvent and an organic aluminum compound under an environment of inert gas and reacting at a temperature of approximately 50° C. and drying; and
   (ii) impregnating a metallocene compound consisting of a Group IV metal into the inorganic carrier by the addition to the inorganic carrier of an organic solvent and said metallocene compound whose diameter is smaller than the diameters of said pores of the inorganic carrier and reacting at a constant temperature and drying.

2. The process for preparing a metallocene catalyst of claim 1, wherein the metallocene compound is one of the substances selected from the group consisting of:
bis ($\eta^5$-cyclopentadienyl)zirconium dichloride, bis ($\eta^5$-cyclopentadienyl)zirconium dimethyl, bis($\eta^5$-cyclopentadienyl)titanium dichloride, bis($\eta^5$-cyclopentadienyl)titanium dimethyl, bis($\eta^5$-cyclopentadienyl)hafnium dichloride, bis($\eta^5$-cyclopentadienyl)hafnium dimethyl,
$\eta^5$-cyclopentadienyltitanium trichloride, $\eta^5$-cyclopentadienyltitanium trimethyl, ethylene-1,2-bis($\eta^5$-1-indenyl) zirconium dichloride, ethylene-1,2-bis($\eta^5$-1-indenyl) zirconium dimethyl, dimethylsilylbis($\eta^5$-1-indenyl)zirconium dichloride, dimethylsilylbis($\eta^5$-1-indenyl)zirconium dimethyl, dimethylsilylbis($\eta^5$-1-indenyl)titanium dichloride, dimethylsilylbis($\eta^5$-1-indenyl)titanium dimethyl, dimethylsilylbis($\eta^5$-1-indenyl)hafnium dichloride, dimethylsilylbis($\eta^5$-1-indenyl)hafnium dimethyl,
ethylene-1,2-bis($\eta^5$-1-indenyl)titanium dichloride, ethylene-1,2-bis($\eta^5$-1-indenyl)titanium dimethyl, ethylene-1,2-bis($\eta^5$-1-indenyl) hafnium dichloride, ethylene-1,2-bis($\eta^5$-1-indenyl)hafnium dimethyl, bis (pentamethyl-$\eta^5$-cyclopentadienyl)zirconium dichloride, bis(pentamethyl-$\eta^5$-cyclopentadienyl)zirconium dimethyl, bis (pentamethyl-$\eta^5$-cyclopentadienyl)titanium dichloride, bis (pentamethyl-$\eta^5$-cyclopentadienyl) titanium dimethyl, bis (pentamethyl-$\eta^5$-cyclopentadienyl) hafnium dichloride, bis (pentamethyl-$\eta^5$-cyclopentadienyl)hafnium dimethyl, bis($\eta^5$-1-indenyl) zirconium dichloride, bis($\eta^5$-1-indenyl)zirconium dimethyl,
isopropylidene($\eta^5$-9-fluorenyl) ($\eta^5$-1-cyclopentadienyl) zirconium dichloride, isopropylidene($\eta^5$-9-fluorenyl) ($\eta^5$-1-cyclopentadienyl)zirconium dimethyl, dimethylsilyl ($\eta^5$-9-fluorenyl) ($\eta^5$-1-cyclopentadienyl) zirconium dichloride, dimethylsilyl($\eta^5$-9-fluorenyl) ($\eta^5$-1-cyclopentadienyl)zirconium dimethyl, (tert-butylamido) dimethyl(tetramethyl-$\eta^5$-cyclopentadienyl)silanetitanium dichloride, (tertbutylamido)dimethyl(tetramethyl-$\eta^5$-cyclopentadienyl) silanetitanium dimethyl, (tert-butylamido)dimethyl(tetramethyl-$\eta^5$-cyclopentadienyl) silanezirconium dichloride, and (tertbutylamido)dimethyl (tetramethyl-$\eta^5$-cyclopentadienyl)silanezirconium dimethyl, provided that a VPI-5 zeolite is used as the inorganic carrier.

3. The process for preparing a metallocene catalyst of claim 1, wherein said inorganic carrier, metallocene and said organic aluminum compounds are added in a way that the weight ratio in the final product of said inorganic carrier-:metal of said metallocene compound: aluminum of said aluminum compound is controlled at a range of 1 to 0.001:1 to 0.001:1.

4. The process for preparing a metallocene catalyst of claim 1, wherein the impregnation of said metallocene compound is carried out at a temperature between 20° C. and the boiling point of the organic solvent used in step (ii) for 0.5 to 72 hours.

5. The process for preparing a metallocene catalyst of claim 1, wherein the organic aluminum compound is one of the substances selected from the group consisting of: methyl aluminoxane; ethyl aluminoxane; alkyl aluminum; and haloalkyl aluminum represented as a general formula $AlR_iX_j$ (wherein R and X represents alkyl and halogen respectively and wherein i represents 1 or 2 and j represents 1 or 2 except i and j cannot simultaneously be (1 or 2).

6. The process for preparing a metallocene catalyst of claim 1, wherein the metallocene compound is one of the substances selected from the group consisting of: bis($\eta^5$-cyclopentadienyl)zirconium dichloride, bis($\eta^5$-cyclopentadienyl)zirconium dimethyl, bis($\eta^5$-cyclopentadienyl)titanium dichloride, bis($\eta^5$-cyclopentadienyl)titanium dimethyl, bis($\eta^5$-cyclopentadienyl) hafnium dichloride, bis($\eta^5$-cyclopentadienyl)hafnium dimethyl, $\eta^5$-cyclopentadienyltitanium trichloride and $\eta^5$-cyclopentadienyltitanium trimethyl, provided that a Faujasite zeolite is used as the inorganic carrier.

7. The process for preparing a metallocene catalyst of claim 1, wherein the organic solvent of steps (i) and (ii) is selected from the group consisting of toluene, hexane, heptane, octane, xylene and mixtures thereof.

* * * * *